United States Patent
Kikuchi et al.

(10) Patent No.: US 9,969,877 B2
(45) Date of Patent: May 15, 2018

(54) RESIN COMPOSITIONS, RESIN MOLDED ARTICLES, PROCESSES FOR PREPARING RESIN MOLDED ARTICLES, AND LASER DIRECT STRUCTURING ADDITIVES

(71) Applicant: MITSUBISHI ENGINEERING-PLASTICS CORPORATION, Tokyo (JP)

(72) Inventors: Tatsuya Kikuchi, Kanagawa (JP); Ryusuke Yamada, Kanagawa (JP); Yasushi Yamanaka, Kanagawa (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 230 days.

(21) Appl. No.: 14/895,178

(22) PCT Filed: Jun. 25, 2014

(86) PCT No.: PCT/JP2014/066774
§ 371 (c)(1),
(2) Date: Dec. 1, 2015

(87) PCT Pub. No.: WO2015/005111
PCT Pub. Date: Jan. 15, 2015

(65) Prior Publication Data
US 2016/0108234 A1 Apr. 21, 2016

(30) Foreign Application Priority Data

Jul. 9, 2013 (JP) .................................. 2013-143381
Sep. 5, 2013 (JP) .................................. 2013-184024
Jun. 4, 2014 (JP) .................................. 2014-115821

(51) Int. Cl.
*C08L 69/00* (2006.01)
*C08K 3/22* (2006.01)
(Continued)

(52) U.S. Cl.
CPC .............. *C08L 69/00* (2013.01); *B32B 15/08* (2013.01); *C08K 3/08* (2013.01); *C08K 3/10* (2013.01);
(Continued)

(58) Field of Classification Search
CPC .... H01B 1/02; C08K 3/22; C08K 2003/2227; C08K 2003/2296; C08K 2003/2231;
(Continued)

(56) References Cited

U.S. PATENT DOCUMENTS

2014/0002311 A1 1/2014 Takano et al.
2015/0244066 A1 8/2015 Takano et al.
2015/0247243 A1 9/2015 Takano et al.

FOREIGN PATENT DOCUMENTS

CN 104583330 A 4/2015
CN 104619783 A 5/2015
(Continued)

OTHER PUBLICATIONS

Extended European Search Report, dated Mar. 31, 2016, for European Application No. 14823024.6.
(Continued)

*Primary Examiner* — Fred M Teskin
(74) *Attorney, Agent, or Firm* — Birch, Stewart, Kolasch & Birch, LLP

(57) ABSTRACT

Provided is a resin composition having higher platability. The resin composition contains at least two kinds of metals and also containing a conductive oxide having a resistivity of $5 \times 10^3$ Ω·cm or less.

20 Claims, 1 Drawing Sheet

(51) Int. Cl.
| | |
|---|---|
| *C08K 3/40* | (2006.01) |
| *C08L 67/02* | (2006.01) |
| *C08L 101/00* | (2006.01) |
| *B32B 15/08* | (2006.01) |
| *H01B 1/02* | (2006.01) |
| *C23C 18/20* | (2006.01) |
| *C23C 18/31* | (2006.01) |
| *C08K 3/10* | (2006.01) |
| *C08K 3/14* | (2006.01) |
| *C08K 3/34* | (2006.01) |
| *C08L 25/00* | (2006.01) |
| *C09D 177/06* | (2006.01) |
| *C08L 77/06* | (2006.01) |
| *C23C 18/12* | (2006.01) |
| *C23C 18/16* | (2006.01) |
| *C08K 3/08* | (2006.01) |
| *C08K 7/14* | (2006.01) |
| *H04M 1/02* | (2006.01) |
| *C23C 18/38* | (2006.01) |

(52) U.S. Cl.
CPC ............... *C08K 3/22* (2013.01); *C08K 3/34* (2013.01); *C08K 3/346* (2013.01); *C08K 3/40* (2013.01); *C08K 7/14* (2013.01); *C08L 25/00* (2013.01); *C08L 67/02* (2013.01); *C08L 77/06* (2013.01); *C08L 101/00* (2013.01); *C09D 177/06* (2013.01); *C23C 18/1237* (2013.01); *C23C 18/1608* (2013.01); *C23C 18/1612* (2013.01); *C23C 18/204* (2013.01); *H01B 1/02* (2013.01); *H04M 1/0202* (2013.01); *B32B 2457/00* (2013.01); *C08K 2003/0812* (2013.01); *C08K 2003/0893* (2013.01); *C08K 2003/2241* (2013.01); *C08K 2003/2296* (2013.01); *C08K 2201/014* (2013.01); *C08L 2203/20* (2013.01); *C08L 2205/025* (2013.01); *C08L 2205/06* (2013.01); *C23C 18/38* (2013.01)

(58) Field of Classification Search
CPC ..... C23C 18/1237; C23C 18/38; C08L 69/00; C08L 77/06; C08L 2203/20

USPC .......................................... 428/412; 252/512
See application file for complete search history.

(56) References Cited

FOREIGN PATENT DOCUMENTS

| | | |
|---|---|---|
| JP | 2013-144768 A | 7/2013 |
| JP | 2014-58603 A | 4/2014 |
| JP | 2014-58604 A | 4/2014 |
| WO | WO 2011/076729 A1 | 6/2011 |
| WO | WO 2011/076730 A1 | 6/2011 |
| WO | WO 2011/095632 A1 | 8/2011 |
| WO | WO 2012/056385 A1 | 5/2012 |
| WO | WO 2012/056416 A1 | 5/2012 |
| WO | WO 2012/126831 A1 | 9/2012 |
| WO | WO 2012/128219 A1 | 9/2012 |
| WO | WO 2013/076314 A1 | 5/2013 |
| WO | WO 2014/042070 A1 | 3/2014 |
| WO | WO 2014/042071 A1 | 3/2014 |

OTHER PUBLICATIONS

Korean Office Action, dated Feb. 23, 2016, for Korean Application No. 10-2015-7036509, with an English translation thereof.
Second Chinese Office Action and Search Report dated Nov. 28, 2016, for Chinese Application No. 201480036802.6, with machine English translation.
Chinese Office Action dated May 2, 2017, issued in corresponding Chinese patent application No. 201480036802.6 with English machine translation.
International Preliminary Report on Patentability and Written Opinion of the International Searching Authority (Forms PCT/IB/338, PCT/ISA/237, PCT/IB/326 and PCT/IB/373) for International Application No. PCT/JP2014/066774, dated Jan. 21, 2016, with an English translation.
International Search Report and Written Opinion of the International Searching Authority (Forms PCT/ISA/210 and PCT/ISA/237) for International Application No. PCT/JP2014/066774, dated Sep. 22, 2014.
Chinese Office Action and Search Report for Chinese Application No. 201480036802.6, dated Jul. 5, 2016, with a partial English translation.

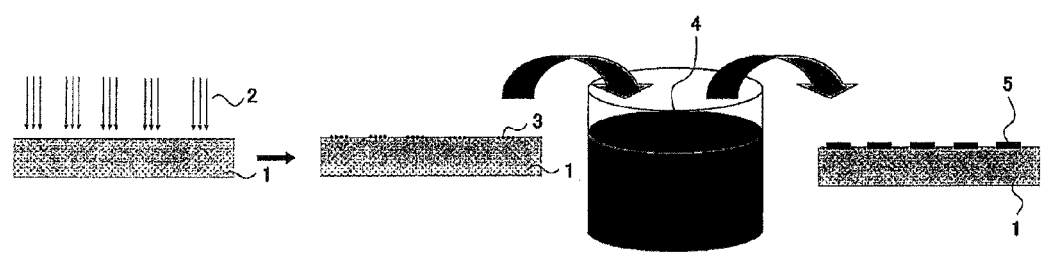

RESIN COMPOSITIONS, RESIN MOLDED ARTICLES, PROCESSES FOR PREPARING RESIN MOLDED ARTICLES, AND LASER DIRECT STRUCTURING ADDITIVES

TECHNICAL FIELD

The present invention relates to resin compositions for use in laser direct structuring. It also relates to resin molded articles obtained by molding the resin compositions, and processes for preparing resin molded articles having a plated layer formed on a surface of the resin molded articles. Further, it also relates to novel laser direct structuring additives.

BACKGROUND ART

With recent development of cell phones including smartphones, various processes for manufacturing antennas inside the cell phones have been proposed. Especially, it would be desirable to provide a process for manufacturing an antenna that can be three-dimensionally designed in a cell phone. The laser direct structuring (hereinafter sometimes referred to as "LDS") technology has drawn attention as one of technologies for forming such three-dimensional antennas. The LDS technology refers to a technology for forming a plated layer by, for example, irradiating a surface of a resin molded article containing an LDS additive with a laser beam to activate only the region irradiated with the laser beam and applying a metal on the activated region. This technology is characterized in that metal structures such as antennas can be directly manufactured on a surface of resin substrates without using any adhesives or the like. The LDS technology is disclosed in, for example, patent documents 1 to 4 and the like.

REFERENCES

Patent Documents

Patent document 1: International Publication WO2011/095632
Patent document 2: International Publication WO2011/076729
Patent document 3: International Publication WO2011/076730
Patent document 4: International Publication WO2012/128219

SUMMARY OF THE INVENTION

Problems to be Solved by the Invention

The LDS technology is facing increasingly demanding requirements, including demands for resin compositions having higher platability. The present invention aims to solve these challenges, thereby providing resin compositions having higher platability.

Means to Solve the Problems

As a result of our careful studies under these circumstances, we achieved the present invention on the basis of the finding that resin compositions having higher platability can be provided when the resin compositions incorporate a laser direct structuring additive (hereinafter sometimes referred to as "LDS additive") containing at least two kinds of metals and also containing a conductive oxide having a resistivity of $5 \times 10^3$ Ω·cm or less. Specifically, the above problems are solved by the following <1>, preferably <2> to <28>.

<1> A resin composition comprising a thermoplastic resin, and a laser direct structuring additive containing at least two kinds of metals and also containing a conductive oxide having a resistivity of $5 \times 10^3$ Ω·cm or less.

<2> The resin composition according to <1>, wherein the laser direct structuring additive contains at least a metal of Group n, wherein n is an integer of 3 to 16, and a metal of Group n+1 of the periodic table.

<3> The resin composition according to <2>, wherein an amount of one of the metal of Group n, wherein n is an integer of 3 to 16, and the metal of Group n+1 of the periodic table contained in the laser direct structuring additive is 15 mol % or less provided that the total amount of the metals is 100 mol %.

<4> The resin composition according to <2> or <3>, wherein n is 12.

<5> The resin composition according to <2> or <3>, wherein the metal of Group n, wherein n is an integer of 3 to 16, of the periodic table is zinc.

<6> The resin composition according to <2> or <3>, wherein the metal of Group n+1 of the periodic table is aluminum.

<7> The resin composition according to any one of <1> to <6>, wherein the thermoplastic resin comprises resin components including 40 to 100% by weight of a polycarbonate resin and 0 to 60% by weight of a styrene-based resin.

<8> The resin composition according to any one of <1> to <6>, wherein the thermoplastic resin comprises a polyamide resin.

<9> The resin composition according to any one of <1> to <6>, wherein the thermoplastic resin comprises a thermoplastic polyester resin.

<10> The resin composition according to any one of <1> to <9>, further comprising a glass filler.

<11> The resin composition according to any one of <1> to <10>, further comprising a silicate mineral.

<12> The resin composition according to <11>, wherein the silicate mineral is talc.

<13> The resin composition according to any one of <1> to <12>, further comprising a non-conductive metal oxide.

<14> The resin composition according to <13>, wherein the non-conductive metal oxide is a titanium oxide.

<15> A resin molded article obtained by molding the resin composition according to any one of <1> to <14>.

<16> The resin molded article according to <15>, having a plated layer on a surface of the resin molded article.

<17> The resin molded article according to <16>, wherein the plated layer has performance as an antenna.

<18> The resin molded article according to any one of <15> to <17>, which is a part for portable electronic devices.

<19> A process for preparing a resin molded article having a plated layer, comprising irradiating a surface of a resin molded article obtained by molding the resin composition according to any one of <1> to <14> with a laser beam, and then applying a metal to form the plated layer.

<20> The process for preparing a resin molded article having a plated layer according to <19>, wherein the plated layer is a copper plated layer.

<21> A process for manufacturing a part having an antenna for portable electronic devices, comprising the process for preparing a resin molded article having a plated layer according to <19> or <20>.

<22> A laser direct structuring additive comprising a conductive oxide having a resistivity of 5×10³ Ω·cm or less, which contains at least a metal of Group n, wherein n is an integer of 3 to 16, and a metal of Group n+1 of the periodic table, wherein the amount of one of the metal of Group n, wherein n is an integer of 3 to 16, and the metal of Group n+1 of the periodic table contained is 15 mol % or less while the other metal accounts for the remainder provided that the total amount of the metals is 100 mol %.
<23> The laser direct structuring additive according to <21>, wherein the metal contained in the laser direct structuring additive is aluminum and zinc.
<24> The resin composition according to any one of <1> to <14>, wherein the glass filler has an average fiber diameter of 20 μm or less and an average fiber diameter of 20 μm or less.
<25> The resin composition according to any one of <1> to <14> and <24>, wherein the glass filler is bundled by at least one kind of resin selected from polyolefin resins, silicone resins, epoxy resins and urethane resins.
<26> The resin composition according to any one of <1> to <14>, <24> and <25>, further comprising an elastomer.
<27> The resin composition according to any one of <1> to <14>, and <24> to <25>, further comprising phosphorus-based stabilizer and/or antioxidant.
<28> The resin composition according to any one of <1> to <14>, and <24> to <27>, wherein the conductive oxide is free from antimony atom.

Advantages of the Invention

The present invention made it possible to provide resin compositions having higher platability.

BRIEF EXPLANATION OF THE DRAWINGS

FIG. 1 is a schematic diagram showing a process for plating a surface of a resin molded article. In FIG. 1, the following reference numerals represent the parts as follows: 1, resin molded article; 2, laser beam; 3, laser-irradiated region; 4, plating solution; 5, plated layer.

THE MOST PREFERRED EMBODIMENTS OF THE INVENTION

The present invention will be explained in detail below. As used herein, each numerical range expressed by two values on both sides of "to" is used to mean the range including the values indicated before and after "to" as lower and upper limits.

The resin compositions of the present invention are characterized in that they comprise a thermoplastic resin and a laser direct structuring additive (LDS additive) containing a conductive oxide having a resistivity of 5×10³ Ω·cm or less. When such an LDS additive is used, higher platability can be achieved.

The resin compositions of the present invention are explained in detail below.
<Laser Direct Structuring Additive (LDS Additive)>
The LDS additive used in the present invention preferably contains a conductive oxide having a resistivity of 5×10³ Ω·cm or less. When such an LDS additive is incorporated, platability can be improved.

As used herein, the term "LDS additive" refers to a compound that allows a test specimen of a polycarbonate resin (Iupilon® S-3000F from Mitsubishi Engineering-Plastics Corporation) to be plated when 4 parts by mass of the compound as a possible LDS additive is added per 100 parts by mass of the resin and the resin is subjected to a printing process by irradiation with a YAG laser beam having a wavelength of 1064 nm under the conditions of any output power in the range of 2.6 to 13 W, any speed of 1 to 4 m/s and any pulse period in the range of 10 to 50 μs, and subsequently the test specimen is treated with the pretreatment solution "LDS Select Prep 2000" from MacDermid and then subjected to a plating process using the plating bath "MID Copper 100XB" from MacDermid.

The conductive oxide contained in the LDS additive has a resistivity of 5×10³ Ω·cm or less, preferably 8×10² Ω·cm or less, more preferably 7×10² Ω·cm or less, even more preferably 5×10² Ω·cm or less. The lower limit is not specifically defined, but can be, for example, 1×10¹ Ω·cm or more, more particularly 1×10² Ω·cm or more.

As used herein, the resistivity of the conductive oxide typically refers to the powder resistivity, which can be measured with the tester "model 3223" from Yokogawa Electric Corporation by loading 10 g of fine powder of the conductive oxide into a cylinder having an internal diameter of 25 mm coated with Teflon® on the inside and pressurizing it at 100 kg/cm² (packing density 20%).

The LDS additive used in the present invention is not specifically limited so far as it contains a conductive oxide having a resistivity of 5×10³ Ω·cm or less, but it preferably contains at least two kinds of metals, specifically it preferably contains a metal of Group n (wherein n is an integer of 3 to 16) and a metal of Group n+1 of the periodic table. Preferably, n is an integer of 10 to 13, more preferably 12 or 13.

Further in the present invention, the amount of one of the metal of Group n (wherein n is an integer of 3 to 16) and the metal of Group n+1 of the periodic table contained in the laser direct structuring additive used in the present invention is preferably 15 mol % or less, more preferably 12 mol % or less, especially preferably 10 mol % or less provided that the total amount of the metals is 100 mol %. The lower limit is not specifically defined, but should be 0.0001 mol % or more. When the two or more metals are contained in an amount in such ranges, platability can be improved. In the present invention, an oxide of a metal of Group n doped with a metal of Group n+1 is especially preferred.

Further, the metal of Group n and the metal of Group n+1 of the periodic table described above preferably account for 98% by weight or more of metal components contained in the LDS additive used in the present invention.

Metals of Group n of the periodic table include, for example, metals of Group 3 (scandium, yttrium), Group 4 (titanium, zirconium and the like), Group 5 (vanadium, niobium and the like), Group 6 (chromium, molybdenum and the like), Group 7 (manganese and the like), Group 8 (iron, ruthenium and the like), Group 9 (cobalt, rhodium, iridium and the like), Group 10 (nickel, palladium, platinum), Group 11 (copper, silver, gold and the like), Group 12 (zinc, cadmium and the like), Group 13 (aluminum, gallium, indium and the like), Group 14 (germanium, tin and the like), Group 15 (arsenic, antimony and the like), and Group 16 (selenium, tellurium and the like), as well as oxides of these metals and the like. Among others, metals of Group 12 (n=12) or oxides thereof are preferred, more preferably zinc.

Metals of Group n+1 of the periodic table include, for example, metals of Group 4 (titanium, zirconium and the like), Group 5 (vanadium, niobium and the like), Group 6 (chromium, molybdenum and the like), Group 7 (manganese and the like), Group 8 (iron, ruthenium and the like), Group 9 (cobalt, rhodium, iridium and the like), Group 10 (nickel, palladium, platinum), Group 11 (copper, silver, gold and the like), Group 12 (zinc, cadmium and the like), Group 13 (aluminum, gallium, indium and the like), Group 14 (germanium, tin and the like), Group 15 (arsenic, antimony and the like), and Group 16 (selenium, tellurium and the like), as well as oxides of these metals and the like. Among others, metals of Group 13 (n+1=13) or oxides thereof are preferred, more preferably aluminum or gallium, even more preferably aluminum.

The LDS additive used in the present invention may contain metals other than the conductive metal oxide. Examples of metals other than the conductive oxide include antimony, titanium, indium, iron, cobalt, nickel, cadmium, silver, bismuth, arsenic, manganese, chromium, magnesium, calcium and the like. These metals may exist as their oxides. These metals are each preferably contained in an amount of 0.01% by weight or less of the LDS additive.

It should be noted that the LDS additive used in the present invention preferably contains antimony in an amount of 3% by weight or less, more preferably 1% by weight or less, even more preferably 0.01% by weight or less of the LDS additive, especially preferably substantially zero to improve the L value. Substantially zero means that the component of interest is not contained in any ranges that would influence the advantages of the present invention.

The LDS additive used in the present invention is preferably capable of absorbing light having a wavelength of 1064 nm. When it is capable of absorbing light having a wavelength of 1064 nm, a plated layer can be readily formed on a surface of resin molded articles.

The LDS additive used in the present invention preferably has a particle size of 0.01 to 50 μm, more preferably 0.05 to 30 μm. When it has such a feature, the homogeneity of the state of plated surfaces tends to be more improved.

The LDS additive used in the present invention is preferably contained in an amount of 3 parts by weight or more, more preferably 5 parts by weight or more, even more preferably 8 parts by weight or more per 100 parts by weight of resin components. The upper limit is preferably 40 parts by weight or less, more preferably 30 parts by weight or less, even more preferably 25 parts by weight or less, especially preferably 20 parts by weight or less. The resin compositions of the present invention may contain only one or more than one LDS additive. If two or more LDS additives are contained, the total amount should be in the ranges defined above.

The LDS additive used in the present invention may be synthesized or commercially available. In addition to commercially available products sold for use as LDS additives, those sold for other purposes may also be used so far as they meet the requirements for the LDS additive in the present invention.

<Thermoplastic Resin>

The resin compositions of the present invention comprise a thermoplastic resin.

The thermoplastic resin compositions of the present invention comprise a thermoplastic resin. The type of the thermoplastic resin is not specifically limited, and examples include polycarbonate resins, alloys of polyphenylene ether resins and polystyrene resins, alloys of polyphenylene ether resins and polyamide resins, thermoplastic polyester resins, methyl methacrylate/acrylonitrile/butadiene/styrene copolymer resins, methyl methacrylate/styrene copolymer resins, methyl methacrylate resins, rubber-reinforced methyl methacrylate resins, polyamide resins, polyacetal resins, polylactic resins, polyolefin resins, polyphenylene sulfide resins and the like. In the present invention, at least one of polycarbonate resins, thermoplastic polyester resins and polyamide resins is preferably contained. Preferred embodiments are explained below.

<<An Embodiment Comprising a Polycarbonate Resin as a Major Component>>

In a first embodiment of the thermoplastic resin according to the present invention, the thermoplastic resin comprises a polycarbonate resin as a major component. In the first embodiment, the proportion of the polycarbonate resin in all resin components is preferably 30 to 100% by weight, more preferably 50 to 100% by weight, even more preferably 80 to 100% by weight.

<<<Polycarbonate Resin>>>

The polycarbonate resin used in the present invention is not specifically limited, and any of aromatic polycarbonates, aliphatic polycarbonates, and aromatic-aliphatic polycarbonates can be used. In particular, aromatic polycarbonates are preferred, among which more preferred are thermoplastic aromatic polycarbonate polymers or copolymers obtained by a reaction of an aromatic dihydroxy compound with phosgene or with a diester of carbonic acid.

Aromatic dihydroxy compounds include 2,2-bis(4-hydroxyphenyl)propane (=bisphenol A), tetramethyl bisphenol A, bis(4-hydroxyphenyl)-P-diisopropylbenzene, hydroquinone, resorcinol, 4,4-dihydroxydiphenyl and the like, preferably bisphenol A. Further, compounds containing one or more tetraalkylphosphonium sulfonate moieties attached to the aromatic dihydroxy compounds listed above, or polymers or oligomers having a siloxane structure containing a terminal phenolic OH group at both ends or the like can be used for the purpose of preparing highly flame-retardant compositions.

Preferred examples of polycarbonate resins used in the present invention include polycarbonate resins derived from 2,2-bis(4-hydroxyphenyl)propane; and polycarbonate copolymers derived from 2,2-bis(4-hydroxyphenyl)propane and other aromatic dihydroxy compounds.

The polycarbonate resin preferably has a molecular weight of 14,000 to 30,000, more preferably 15,000 to 28,000, even more preferably 16,000 to 26,000 expressed as the viscosity average molecular weight calculated from the solution viscosity measured at a temperature of 25° C. in methylene chloride as a solvent. The viscosity average molecular weight is preferably in the ranges defined above because mechanical strength is more improved and moldability is also more improved.

The process for preparing the polycarbonate resin is not specifically limited, and polycarbonate resins prepared by any processes such as the phosgene process (interfacial polymerization), and the melt process (transesterification) can be used in the present intention. Further, polycarbonate resins prepared through the step of adjusting the amount of terminal OH groups after typical preparation steps of the melt process may also be used in the present invention.

Further, the polycarbonate resin used in the present invention may be not only a polycarbonate resin as a virgin material but also a polycarbonate resin recycled from used products, i.e., a polycarbonate resin recovered by so-called material recycling.

Other information about the polycarbonate resin used in the present invention can be found in the description at, for example, paragraphs 0018 to 0066 of JPA2012-072338, the disclosure of which is incorporated herein by reference.

The resin compositions of the present invention may contain only one or more than one polycarbonate resin.

<<An Embodiment Comprising a Polycarbonate Resin and a Styrene Resin>>

In a second embodiment, the thermoplastic resin comprises a polycarbonate resin and a styrene resin. Specifically, it more preferably comprises resin components including 40% by weight or more and less than 100% by weight of a polycarbonate resin and more than 0% by weight and 60% by weight or less of a styrene-based resin, even more preferably 40 to 90% by weight of a polycarbonate resin and 60 to 10% by weight of a styrene-based resin, still more preferably 60 to 80% by weight of a polycarbonate resin and 40 to 20% by weight of a styrene-based resin.

Details of the polycarbonate resin can be found in the description of the first embodiment above.

<<<Styrene-Based Resin>>>

Styrene-based resins used in the present invention include polystyrene resins, high impact polystyrene resins (HIPS), acrylonitrile-styrene copolymers (AS resins), acrylonitrile-butadiene-styrene copolymers (ABS resins), acrylonitrile-styrene-acrylic rubber copolymers (ASA resins), acrylonitrile-ethylene propylene rubber-styrene copolymers (AES resins) and the like.

The styrene-based resin refers to at least one polymer selected from the group consisting of styrene polymers made of a styrene monomer, copolymers of a styrene monomer and another vinyl monomer copolymerizable therewith, and copolymers obtained by polymerizing a styrene monomer or a styrene monomer and another vinyl monomer copolymerizable therewith in the presence of a rubber polymer. Among them, copolymers obtained by polymerizing a styrene monomer or a styrene monomer and another vinyl monomer copolymerizable therewith in the presence of a rubber polymer are preferably used.

Specific examples of styrene monomers include styrene and styrene derivatives such as α-methylstyrene, p-methylstyrene, divinylbenzene, ethylvinylbenzene, dimethylstyrene, p-t-butylstyrene, bromostyrene, and dibromostyrene, among which styrene is preferred. It should be noted that these may be used alone or as a mixture of two or more of them.

Vinyl monomers that can be copolymerized with the styrene monomers mentioned above include vinyl cyanide compounds such as acrylonitrile and methacrylonitrile; acrylic acid alkyl esters such as methyl acrylate, ethyl acrylate, propyl acrylate, butyl acrylate, amyl acrylate, hexyl acrylate, 2-ethylhexyl acrylate, octyl acrylate and cyclohexyl acrylate; methacrylic acid alkyl esters such as methyl methacrylate, ethyl methacrylate, propyl methacrylate, butyl methacrylate, amyl methacrylate, hexyl methacrylate, 2-ethylhexyl methacrylate, octyl methacrylate and cyclohexyl methacrylate; acrylic acid aryl esters such as phenyl acrylate and benzyl acrylate; methacrylic acid aryl esters such as phenyl methacrylate and benzyl methacrylate; epoxy-containing acrylic acid esters or methacrylic acid esters such as glycidyl acrylate and glycidyl methacrylate; maleimide monomers such as maleimide, N,N-methylmaleimide and N-phenylmaleimide; α,β-unsaturated carboxylic acids or their anhydrides such as acrylic acid, methacrylic acid, maleic acid, maleic anhydride, fumaric acid and itaconic acid; and the like.

Further, rubber polymers that can be copolymerized with the styrene monomers include polybutadiene, polyisoprene, styrene-butadiene random copolymers and block copolymers, acrylonitrile-butadiene random copolymers and block copolymers, acrylonitrile-butadiene copolymers, copolymers of an acrylic acid alkyl ester or methacrylic acid alkyl ester and butadiene, polybutadiene-polyisoprene diene copolymers; copolymers of ethylene and an α-olefin such as ethylene-isoprene random copolymers and block copolymers, and ethylene-butene random copolymers and block copolymers; copolymers of ethylene and an α,β-unsaturated carboxylic acid ester such as ethylene-methacrylate copolymers and ethylene-butyl acrylate copolymers; ethylene-vinyl acetate copolymers; ethylene-propylene-unconjugated diene terpolymers such as ethylene-propylene-hexadiene copolymers; acrylic rubbers; composite rubbers composed of a polyorganosiloxane rubber and a polyalkyl acrylate or methacrylate rubber; and the like.

Such styrene-based resins include, for example, high impact polystyrenes (HIPS), acrylonitrile-styrene copolymers (AS resins), acrylonitrile-butadiene-styrene copolymers (ABS resins), methyl methacrylate-acrylonitrile-butadiene-styrene copolymers (MABS resins), acrylonitrile-styrene-acrylic rubber copolymers (ASA resins), acrylonitrile-ethylene propylene rubber-styrene copolymers (AES resins), styrene-methyl methacrylate copolymers (MS resins), styrene-maleic anhydride copolymers and the like.

Among them, preferred are acrylonitrile-styrene copolymers (AS resins), acrylonitrile-butadiene-styrene copolymers (ABS resins), acrylonitrile-styrene-acrylic rubber copolymers (ASA resins), and acrylonitrile-ethylene propylene rubber-styrene copolymers (AES resins), more preferably acrylonitrile-butadiene-styrene copolymers (ABS resins), acrylonitrile-styrene-acrylic rubber copolymers (ASA resins), and acrylonitrile-ethylene propylene rubber-styrene copolymers (AES resins), especially preferably acrylonitrile-butadiene-styrene copolymers (ABS resins).

The styrene-based resins described above are prepared by emulsion polymerization, solution polymerization, mass polymerization, suspension polymerization or mass-suspension polymerization or the like processes, and particularly in the present invention, styrene polymers or styrene-based random copolymers or block copolymers are preferably prepared by mass polymerization, suspension polymerization or mass-suspension polymerization while styrene-based graft copolymers are preferably prepared by mass polymerization, mass-suspension polymerization or emulsion polymerization.

The acrylonitrile-butadiene-styrene copolymers (ABS resins) especially preferably used in the present invention are mixtures of a thermoplastic graft copolymer obtained by graft-copolymerizing acrylonitrile and styrene onto a butadiene rubber component and an acrylonitrile-styrene copolymer. The butadiene rubber component preferably represents 5 to 40% by weight, particularly 10 to 35% by weight, especially preferably 13 to 25% by weight of ABS resin components. Further, the rubber particle size is preferably 0.1 to 5 μm, particularly 0.2 to 3 μm, more particularly 0.3 to 1.5 μm, especially preferably 0.4 to 0.9 μm. The rubber particle size distribution may be either a unimodal distribution or a multimodal distribution having two or more peaks.

The resin compositions of the present invention may contain only one or more than one styrene-based resin.

Further, resin components other than the polycarbonate resin and the styrene-based resin may also be contained. However, these components preferably represent 5% by weight or less of all resin components in the present embodiment.

<<An Embodiment Comprising a Polyamide Resin as a Major Component>>

In a third embodiment of the thermoplastic resin according to the present invention, the thermoplastic resin comprises a polyamide resin. In cases where it comprises a polyamide resin, it more preferably comprises 80% by weight or more, even more preferably 90% by weight or more, still more preferably 95% by weight or more, especially preferably 99% by weight or more of the polyamide resin. In cases where the thermoplastic resin comprises a polyamide resin, it comprises at most 100% by weight or less of the polyamide resin. In cases where it comprises a polyamide resin, it may also contain other resin components. However, the other resin components preferably represent 5% by weight or less of all resin components.

<<<Polyamide Resin>>>

Polyamide resins are polymers made up of repeat units consisting of an acid amide obtained by ring-opening polymerization of a lactam, polycondensation of an aminocarboxylic acid, or polycondensation of a diamine with a dibasic acid, and specifically include polyamides 6, 11, 12, 46, 66, 610, 612, 6I, 6/66, 6T/6I, 6/6T, 66/6T, 66/6T/6I, MX polyamides, polytrimethylhexamethylene terephthalamide, polybis(4-aminocyclohexyl)methane dodecanamide, polybis(3-methyl-4-aminocyclohexyl)methane dodecanamide, polyundecamethylene hexahydroterephthalamide and the like, wherein "I" represents an isophthalic acid component and "T" represents a terephthalic acid component.

The polyamide resin used in the present invention is appropriately selected from these polyamide resins taking into consideration various their characteristics and the intended applications of molded articles prepared therefrom and the like.

Among the polyamide resins listed above, preferred are semi-aromatic polyamides made from dicarboxylic acid components containing an aromatic ring or MX polyamides made from diamine components containing an aromatic ring or polyamide resin mixtures thereof because they readily provide compounds containing relatively much fillers capable of enhancing strength such as glass fibers and carbon fibers.

Semi-aromatic polyamides specifically include 6I, 6T/6I, 6/6T, 66/6T, 66/6T/6I and the like.

MX polyamide resins obtained by polycondensation of a xylylenediamine as a diamine component containing an aromatic ring with an α,ω-dibasic acid are preferred because they provide especially high strength resin compositions. They include polyamide resins obtained by polycondensation of p-xylylenediamine and/or m-xylylenediamine with an α,ω-straight chain aliphatic dibasic acid or aromatic dibasic acid containing 6 to 12 carbon atoms, among which especially preferred are MX polyamide resins using sebacic acid and/or adipic acid as a dicarboxylic acid component.

Mixtures of these polyamide resins containing an aromatic ring and aliphatic polyamide resins are also preferably used. Appearance and properties are improved by mixing aliphatic polyamide resins with the polyamide resins containing an aromatic ring described above even though appearance and properties are insufficient when much fillers are added to the aliphatic polyamide resins alone.

Up to 70% by weight of the MX polyamide resins can be replaced by the aliphatic or semi-aromatic polyamide resins (i.e. the polyamide resin mixtures can contain 30% by weight or more of the MX resins).

<<An Embodiment Comprising a Thermoplastic Polyester Resin as a Major Component>>

In a fourth embodiment of the thermoplastic resin according to the present invention, the thermoplastic resin comprises a thermoplastic polyester resin as a major component. In the fourth embodiment, the proportion of the thermoplastic polyester resin in all resin components is preferably 51 to 100% by weight, more preferably 80 to 100% by weight, even more preferably 90 to 100% by weight.

<<<Thermoplastic Polyester Resin>>>

Information about thermoplastic polyester resins can be found in the description at paragraphs 0013 to 0016 of JP-A2010-174223. The polyester resin typically used includes a polybutylene terephthalate resin, or a mixture containing 60% by weight or more, preferably 80% by weight or more of a polybutylene terephthalate resin. For example, one of preferred polyester resins used in the present invention is a mixture of a polybutylene terephthalate resin and a polyethylene terephthalate resin wherein the former accounts for 60% by weight or more, more particularly 80% by weight or more. Further, the mixture of a polybutylene terephthalate resin and a polyethylene terephthalate resin preferably contains 10 to 40% by weight, more preferably 20 to 40% by weight of the polyethylene terephthalate resin.

It is well known that polybutylene terephthalate resins and polyethylene terephthalate resins are mass-produced by a reaction of terephthalic acid or an ester thereof with 1,4-butanediol or ethylene glycol and they are distributed on the market. In the present invention, these commercially available resins can be used. Commercially available resins sometimes contain copolymerizable components other than terephthalic acid components and 1,4-butanediol components or ethylene glycol components, and they can also be used in the present invention so far as they contain small amounts, typically 10% by weight or less, preferably 5% by weight or less of such copolymerizable components.

The polybutylene terephthalate resin typically has an intrinsic viscosity of 0.5 to 1.5 dl/g, especially preferably 0.6 to 1.3 dl/g. If the intrinsic viscosity is lower than 0.5 dl/g, it will be difficult to obtain resin compositions having high mechanical strength. If it is higher than 1.5 dl/g, the resulting resin compositions have low fluidity, which may result in low moldability. Preferably, it has a terminal carboxyl group concentration of 30 meq/g or less. Further, it preferably contains 300 ppm or less of tetrahydrofuran derived from 1,4-butanediol.

On the other hand, the polyethylene terephthalate resin typically has an intrinsic viscosity of 0.4 to 1.0 dl/g, especially preferably 0.5 to 1.0 dl/g. If the intrinsic viscosity is lower than 0.4, the resulting resin compositions are likely to have low mechanical properties, but if it exceeds 1.0, their fluidity is likely to decrease. It should be noted that all of the intrinsic viscosities are the values measured in a mixed solvent of phenol/tetrachloroethane (weight ratio 1/1) at 30° C.

The resin compositions of the present invention may contain only one or more than one thermoplastic polyester resin.

In the present embodiment, resin components other than the thermoplastic polyester resin may also be contained. However, the other resin components preferably represent 5% by weight or less of all resin components.

<<An Embodiment Comprising a Polyacetal Resin as a Major Component>>

In a fifth embodiment of the thermoplastic resin according to the present invention, the thermoplastic resin comprises a polyacetal resin. In cases where it comprises a polyacetal resin, it more preferably comprises 80% by weight or more, even more preferably 90% by weight or more, still more preferably 95% by weight or more, especially preferably 99% by weight or more of the polyacetal resin. In cases where the thermoplastic resin comprises a polyacetal resin, it comprises at most 100% by weight or less of the polyacetal resin. In cases where it comprises a polyacetal resin, it may also contain other resin components. However, the other resin components preferably represent 5% by weight or less of all resin components.

<<<Polyacetal Resin>>>

Information about polyacetal resins can be found in the description at paragraph 0011 of JPA2003-003041 and paragraphs 0018 to 0020 of JPA2003-220667.

Information about polyphenylene sulfide resins can be found in the description at paragraphs 0014 to 0016 of JPA-H-10-292114, paragraphs 0011 to 0013 of JPA-H-10-279800, and paragraphs 0011 to 0015 of JPA2009-30030.

Preferably, the resin compositions of the present invention comprise 40% by weight or more of resin components, more preferably 50% by weight or more of resin components, even more preferably 60% by weight or more of resin components based on the total compositions. In cases where fibers (including glass fillers) are contained, the fibers and resin components in total preferably account for 80% by weight or more.

<Non-Conductive Metal Oxide>

The resin compositions of the present invention may contain a non-conductive metal oxide to improve the platability of resin molded articles prepared therefrom. When a non-conductive metal oxide is contained, platability can be more improved.

The non-conductive metal oxide is not specifically limited so far as it is an electrically non-conductive metal oxide, but preferably a titanium oxide.

Titanium oxides include, for example, titanium monoxide (TiO), dititanium trioxide ($Ti_2O_3$), titanium dioxide ($TiO_2$) and the like, and any of them may be used, among which titanium dioxide is preferred. Further, titanium oxides having the rutile crystal structure are preferably used.

The titanium oxide preferably has an average primary particle size of 1 μm or less, more preferably in the range of 0.001 to 0.5 μm, even more preferably in the range of 0.002 to 0.1 μm. When the titanium oxide has an average particle size in such ranges and is contained in an amount in the ranges defined above, resin molded articles having high whiteness and high surface reflectance can be obtained.

The titanium oxide may be used after it has been surface-treated. Surface treating agents preferably include inorganic materials and/or organic materials. Specifically, they include metal oxides such as silica, alumina, zinc oxide and the like; and organic materials such as silane coupling agents, titanium coupling agents, organic acids, polyols, silicones and the like.

Further, commercially available titanium oxides may also be used. In addition, titanium oxide lumps or particles having a large average size may be used after they have been ground by a suitable means and classified as appropriate through a sieve or the like into the average particle size defined above.

The amount of the non-conductive metal oxide optionally contained in the resin compositions of the present invention is preferably 0.1 part by weight or more, more preferably 1 part by weight or more, even more preferably 3 parts by weight or more per 100 parts by weight of resin components. The upper limit is preferably 80 parts by weight or less, preferably 20 parts by weight or less, more preferably 12 parts by weight or less, even more preferably 8 parts by weight or less.

In specific cases where an amorphous resin is used as a thermoplastic resin and a non-conductive metal oxide is contained, the weight ratio between the non-conductive metal oxide and the LDS additive is preferably 0.1:1 to 0.9:1, more preferably 0.4:1 to 0.8:1. When it is contained in such ranges, platability can be more improved. In alternative cases where a crystalline resin is used as a thermoplastic resin and a non-conductive metal oxide is contained, the weight ratio between the non-conductive metal oxide and the LDS additive is preferably 10:1 to 1.2:1, more preferably 8:1 to 1.5:1, even more preferably 6:1 to 1.5:1. When it is contained in such ranges, platability can be more improved.

The resin compositions of the present invention may contain only one or more than one non-conductive metal oxide. If two or more non-conductive metal oxides are contained, the total amount should be in the ranges defined above. When such an amount is selected, a decrease in reflectance after heat treatment can be prevented. Among titanium oxide products widely available on the market, those containing 80% by weight or more of a titanium oxide are preferably used because of whiteness and opacity.

When a non-conductive metal oxide is contained, high platability can also be achieved even with lower amounts of the LDS additive.

<Glass Filler>

The resin compositions of the present invention may contain a glass filler. Glass fillers include glass fiber, plate glass, glass bead, and glass flake, among which glass fiber is preferred.

The glass filler comprises a glass composition such as A-glass, C-glass, E-glass, or S-glass, among which E-glass (alkali-free glass) is especially preferred because it does not adversely affect polycarbonate resins.

Glass fiber refers to a glass material having a truly round or polygonal cross-section perpendicular to the longitudinal direction and presenting a fibrous appearance.

The glass fiber used in the resin compositions of the present invention may be in the form of a single filament or a twisted yarn composed of a plurality of single filaments.

The glass fiber may be in any form such as a single filament or a twisted yarn composed of a plurality of single filaments continuously wound up in a roll called "glass roving", or glass filaments cut to a specified length of 1 to 10 mm called "chopped strands", or glass filaments milled to a length of about 10 to 500 μm called "milled fiber" or the like. Such glass fibers are readily available as they are commercially available from Asahi Fiber Glass Co., Ltd. under the brand name "Glasslon chopped strands" or "Glasslon milled fibers". Glass fibers in different forms can be used in combination.

In the present invention, glass fibers having a modified cross-sectional shape are also preferred. The modified cross-sectional shape preferably has a flatness of, for example, 1.5 to 10, particularly 2.5 to 10, more particularly 2.5 to 8, especially 2.5 to 5 provided that the flatness is defined as a major axis/minor axis ratio (D2/D1) wherein D2 is the major axis and D1 is the minor axis of a section of a fiber perpendicular to the longitudinal direction. Information about such flat glass can be found in the description at paragraphs 0065 to 0072 of JPA2011-195820, the disclosure of which is incorporated herein by reference.

Glass bead refers to a glass material in the form of a sphere having an outer diameter of 10 to 100 μm and it is readily available as it is commercially available from, for example, Potters-Ballotini Co., Ltd. under the brand name "EGB731". Glass flake refers to a glass material in the form of a flake having a thickness of 1 to 20 μm and a side length of 0.05 to 1 mm and it is readily available as it is commercially available from, for example, Nippon Sheet Glass Co. Ltd. under the brand name "FLEKA".

To further improve the platability of the resin compositions of the present invention, a specific embodiment uses a glass fiber having an average fiber length of 300 μm or less.

The glass fiber used in this embodiment preferably has an average fiber length of 200 μm or less, more preferably 150 μm or less, even more preferably 120 μm or less to improve platability. The lower limit is preferably 5 μm or more, more preferably 7 μm or more, even more preferably 15 μm or more. Further, the glass fiber preferably has an average fiber diameter of 20 μm or less, more preferably 5 to 15 μm, even more preferably 7 to 15 μm, especially preferably 9 to 15 μm. If the average fiber diameter is less than 5 μm, the resin compositions may be poor in moldability, but if the average fiber diameter exceeds 20 μm, the resulting resin molded articles may be poor in appearance and insufficiently reinforced. As used herein, the average fiber length refers to weight average fiber length.

The amount of the glass filler optionally contained in the resin compositions of the present invention is preferably 1 part by weight or more, more preferably 10 parts by weight or more, even more preferably 15 parts by weight or more per 100 parts by weight of resin components. The upper limit is preferably 150 parts by weight or less, more preferably 100 parts by weight or less, even more preferably 85 parts by weight or less. For some applications, it can be 60 parts by weight or less, particularly 50 parts by weight or less, more particularly 20 parts by weight or less.

The resin compositions of the present invention may contain only one or more than one glass filler. If two or more glass fillers are contained, the total amount should be in the ranges defined above. When a glass filler is contained, mechanical strength can be improved and platability also tends to be improved.

<Sizing Agent>

The glass filler contained in the resin compositions of the present invention is preferably coated with a sizing agent. The type of the sizing agent is not specifically limited. A single sizing agent or a combination of two or more sizing agents may be used. Sizing agents include, for example, polyolefin resins, silicone resins, epoxy resins, urethane resins and the like.

The amount of the sizing agent contained in the resin compositions of the present invention is preferably 0.1 to 5.0% by weight, more preferably 0.2 to 2.0% by weight of the glass filler. The resin compositions of the present invention may contain only one or more than one sizing agent. If two or more sizing agents are contained, the total amount should be in the ranges defined above.

<Elastomer>

The resin compositions of the present invention may contain an elastomer. When an elastomer is contained, the impact resistance of the resin compositions can be improved. Elastomers used in the present invention include methyl methacrylate-butadiene-styrene copolymers (MBS resins), styrene-butadiene triblock copolymers and their hydrogenated versions called SBS and SEBS, styrene-isoprene triblock copolymers and their hydrogenated versions called SPS and SEPS, olefinic thermoplastic elastomers called TPO, polyester elastomers, siloxane rubbers, acrylate rubbers and the like. Elastomers that can be used include the elastomers described in paragraphs 0075 to 0088 of JPA2012-251061, the elastomers described in paragraphs 0101 to 0107 of JPA2012-177047 and the like, the disclosures of which are incorporated herein by reference. Preferably, the elastomer used in the present invention contains less than 10% by mass, more preferably 5% by mass or less, even more preferably 3% by mass or less of an acrylonitrile/butadiene/styrene copolymer based on the total amount.

The elastomer used in the present invention is preferably a graft copolymer obtained by graft copolymerization of a rubber component and a monomer component copolymerizable therewith. The graft copolymer may be prepared by any process such as mass polymerization, solution polymerization, suspension polymerization, emulsion polymerization or the like, and may be prepared by single-stage or multistage graft copolymerization.

The rubber component typically has a glass transition temperature of 0° C. or less, preferably −20° C. or less, more preferably −30° C. or less. Specific examples of rubber components include polybutadiene rubbers, polyisoprene rubbers; poly(alkyl acrylate) rubbers such as poly(butyl acrylate), poly(2-ethylhexyl acrylate), and butyl acrylate/2-ethylhexyl acrylate copolymers; silicone rubbers such as polyorganosiloxane rubbers; butadiene-acrylic composite rubbers; IPN (Interpenetrating Polymer Network) composite rubbers composed of a polyorganosiloxane rubber and a poly(alkyl acrylate) rubber; styrene-butadiene rubbers; ethylene-α-olefin rubbers such as ethylene-propylene rubbers, ethylene-butene rubbers, and ethylene-octene rubbers; ethylene-acrylic rubbers; fluororubbers; and the like. These may be used alone or as a mixture of two or more of them. Among them, polybutadiene rubbers, poly(alkyl acrylate) rubbers, polyorganosiloxane rubbers, IPN composite rubbers composed of a polyorganosiloxane rubber and a poly (alkyl acrylate) rubber, and styrene-butadiene rubbers are preferred to improve mechanical properties and surface appearance.

Specific examples of monomer components that can be graft-copolymerized with the rubber components include aromatic vinyl compounds, vinyl cyanide compounds, (meth)acrylic acid ester compounds, (meth)acrylic acid compounds, epoxy-containing (meth)acrylic acid ester compounds such as glycidyl (meth)acrylate; maleimide compounds such as maleimide, N-methylmaleimide and N-phenylmaleimide; α,β-unsaturated carboxylic acid compounds such as maleic acid, phthalic acid and itaconic acid and their anhydrides (e.g., maleic anhydride and the like), etc. These monomer components may be used alone or as a combination of two or more of them. Among them, aromatic vinyl compounds, vinyl cyanide compounds, (meth)acrylic acid ester compounds, and (meth)acrylic acid compounds are preferred to improve mechanical properties and surface appearance, more preferably (meth)acrylic acid ester compounds. Specific examples of (meth)acrylic acid ester compounds include methyl (meth)acrylate, ethyl (meth)acrylate, butyl (meth)acrylate, cyclohexyl (meth)acrylate, octyl (meth)acrylate and the like.

The graft copolymer obtained by copolymerizing a rubber component is preferably a core-shell graft copolymer to improve impact resistance and surface appearance. Among others, especially preferred are core-shell graft copolymers comprising a core layer consisting of at least one rubber component selected from polybutadiene-containing rubbers, polybutyl acrylate-containing rubbers, polyorganosiloxane rubbers, and IPN composite rubbers composed of a polyorganosiloxane rubber and a poly(alkyl acrylate) rubber, and a shell layer formed by copolymerizing a (meth)acrylic acid ester around it. The core-shell graft copolymer preferably contains 40% by mass or more, more preferably 60% by mass or more of the rubber component. Further, it preferably contains 10% by mass or more of (meth)acrylic acid. It should be noted that the core-shell as used herein covers the concept widely encompassing compounds obtained by graft polymerization of a rubber component around a core-forming part though the core layer and the shell layer may not necessarily be definitely demarcated.

Preferred specific examples of these core-shell graft copolymers include methyl methacrylate-butadiene-styrene copolymers (MBS), methyl methacrylate-acrylonitrile-butadiene-styrene copolymers (MABS), methyl methacrylate-butadiene copolymers (MB), methyl methacrylate-acrylic rubber copolymers (MA), methyl methacrylate-acrylic rubber-styrene copolymers (MAS), methyl methacrylate-acrylic/butadiene rubber copolymers, methyl methacrylate-acrylic/butadiene rubber-styrene copolymers, methyl methacrylate-(acrylic/silicone IPN rubber) copolymers, silicone-acrylic composite rubbers containing a polyorganosiloxane and a polyalkyl (meth)acrylate and the like, among which silicone-acrylic composite rubbers containing a polyorganosiloxane and a polyalkyl (meth)acrylate and methyl methacrylate-butadiene copolymers (MB) are especially preferred. Such rubber polymers may be used alone or as a combination of two or more of them.

Such elastomers include, for example, "PARALOID™ (the trademark symbol will be hereinafter omitted) EXL2602", "PARALOID EXL2603", "PARALOID EXL2655", "PARALOID EXL2311", "PARALOID EXL2313", "PARALOID EXL2315", "PARALOID KM330", "PARALOID KM336P", and "PARALOID KCZ201" from Rohm and Haas Japan K.K.; "METABLEN™ (the trademark symbol will be hereinafter omitted) C-223A", "METABLEN E-901", "METABLEN S-2001", "METABLEN SRK-200", and "METABLEN S-2030" from MITSUBISHI RAYON CO., LTD.; "Kane Ace™ (the trademark symbol will be hereinafter omitted) M-511", "Kane Ace M-600", "Kane Ace M-400", "Kane Ace M-580", "Kane Ace M-711", and "Kane Ace MR-01" from Kaneka Corporation; "UBESTA XPA" from Ube Industries, Ltd.; and the like.

The amount of the elastomer optionally contained is preferably 1 to 20 parts by weight, more preferably 1 to 15 parts by weight, even more preferably 2 to 10 parts by weight per 100 parts by weight of resin components.

The resin compositions of the present invention may contain only one or more than one elastomer. If two or more elastomers are contained, the total amount should be in the ranges defined above.

<Silicate Mineral>

The resin compositions of the present invention contain a silicate mineral. According to the present invention, the incorporation of a silicate mineral allows the plating performance of laser-irradiated regions to be more improved and also Charpy notched impact strength to be more improved. The silicate mineral is not specifically limited so far as it is a mineral containing silicon Si and oxygen O, but preferably talc and/or mica, more preferably talc.

The silicate mineral used in the present invention is preferably in the form of particles preferably having an average particle size of 1 to 30 μm, more preferably 2 to 20 μm.

Further, the silicate mineral used in the present invention may have been surface-treated with at least one of compounds selected from polyorganohydrogen siloxanes and organopolysiloxanes, but preferably has not been surface-treated.

The amount of the silicate mineral optionally contained is preferably 0.1 part by weight or more, more preferably 1 part by weight or more, even more preferably 3 parts by weight or more, especially preferably 4 parts by weight or more, or even 5 parts by weight or more per 100 parts by weight of resin components. The upper limit is preferably 30 parts by weight or less, more preferably 20 parts by weight or less, especially preferably 10 parts by weight or less, or even 5 parts by weight or less.

The resin compositions of the present invention may contain only one or more than one silicate mineral. If two or more silicate minerals are contained, the total amount should be in the ranges defined above. If the silicate mineral has been surface-treated, the total amount after surface treatment should preferably be in the ranges defined above.

<White Pigment>

The resin compositions of the present invention may contain a white pigment other than titanium oxides. According to the present invention, the addition of a white pigment allows resin molded articles to be colored. Examples of white pigments include white pigments containing ZnS or ZnO.

The amount of the white pigment optionally contained in the resin compositions of the present invention is preferably 1 to 40 parts by weight, more preferably 3 to 30 parts by weight, even more preferably 5 to 20 parts by weight per 100 parts by weight of resin components.

The resin compositions of the present invention may contain only one or more than one white pigment. If two or more white pigments are contained, the total amount should preferably be in the ranges defined above.

<Phosphorus-Based Stabilizer>

The resin compositions of the present invention preferably contain a phosphorus-based stabilizer.

The phosphorus-based stabilizer is preferably a phosphate ester and a phosphite ester.

The phosphate ester is preferably a compound represented by general formula (3) below:

general formula (3)

$$O=P(OH)_m(OR)_{3-m} \quad (3)$$

In general formula (3), R represents an alkyl group or an aryl group and each may be identical or different. m represents an integer of 0 to 2.

Preferably, R represents an alkyl group containing 1 to 30 carbon atoms or an aryl group containing 6 to 30 carbon atoms, more preferably an alkyl group containing 2 to 25 carbon atoms, phenyl, nonylphenyl, stearylphenyl, 2,4-di-tert-butylphenyl, 2,4-di-tert-butylmethylphenyl, or tolyl.

Phosphate esters include trimethyl phosphate, triethyl phosphate, tributyl phosphate, trioctyl phosphate, triphenyl phosphate, tricresyl phosphate, tris(nonylphenyl) phosphate, 2-ethylphenyldiphenyl phosphate, tetrakis(2,4-di-tert-butylphenyl)-4,4-diphenylene phosphonite and the like.

The phosphite ester is preferably a compound represented by general formula (4) below:

general formula (4)

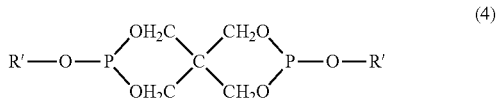

(4)

In general formula (4), R' represents an alkyl group or an aryl group and each may be identical or different.

Preferably, R' represents an alkyl group containing 1 to 25 carbon atoms or an aryl group containing 6 to 12 carbon atoms. When R' represents an alkyl group, it is preferably an alkyl group containing 1 to 30 carbon atoms. When R' represents an aryl group, it is preferably an aryl group containing 6 to 30 carbon atoms.

Phosphite esters include, for example, phosphite triesters, diesters, monoesters and the like such as triphenyl phosphite, trisnonylphenyl phosphite, tris(2,4-di-tert-butylphenyl) phosphite, trinonyl phosphite, tridecyl phosphite, trioctyl phosphite, trioctadecyl phosphite, distearylpentaerythritol diphosphite, tricyclohexyl phosphite, monobutyldiphenyl phosphite, monooctyldiphenyl phosphite, bis(2,4-di-tert-butylphenyl)pentaerythritol phosphite, bis(2,6-di-tert-butyl-4-methylphenyl)pentaerythritol phosphite, and 2,2-methylenebis(4,6-di-tert-butylphenyl)octyl phosphite.

The amount of the phosphorus-based stabilizers optionally contained in the resin compositions of the present invention should be 0.01 to 5 parts by weight, more preferably 0.02 to 2 parts by weight per 100 parts by weight of resin components.

The resin compositions of the present invention may contain only one or more than one phosphorus-based stabilizer. If two or more phosphorus-based stabilizers are contained, the total amount should be in the ranges defined above.

<Antioxidant>

The resin compositions of the present invention may contain an antioxidant. The antioxidant is preferably a phenolic antioxidant, more specifically 2,6-di-t-butyl-4-methylphenol, n-octadecyl 3-(3,5-di-t-butyl-4-hydroxyphenyl)propionate, tetrakis[methylene-3-(3,5-di-t-butyl-4-hydroxyphenyl)propionate]methane, tris(3,5-di-t-butyl-4-hydroxybenzyl) isocyanurate, 4,4'-butylidenebis(3-methyl-6-t-butylphenol), triethylene glycol bis[3-(3-t-butyl-4-hydroxy-5-methylphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane, N,N'-hexamethylenebis[3-(3,5-di-t-butyl-4-hydroxyphenyl)propionamide], pentaerythritol tetrakis[3-(3,5-di-tert-butyl-4-hydroxyphenyl)propionate] and the like. Among others, octadecyl 3-(3,5-di-tert-butyl-4-hydroxyphenyl)propionate, N,N'-hexamethylenebis[3-(3,5-di-t-butyl-4-hydroxyphenyl) propionamide], and pentaerythritol tetrakis[3-(3,5-di-tert-butyl-4-hydroxyphenyl)propionate] are preferred.

The amount of the antioxidant optionally contained in the resin compositions of the present invention is 0.01 to 5 parts by weight, more preferably 0.05 to 3 parts by weight per 100 parts by weight of resin components.

The resin compositions of the present invention may contain only one or more than one antioxidant. If two or more antioxidants are contained, the total amount should be in the ranges defined above.

<Mold Release Agent>

The resin compositions of the present invention may contain a mold release agent. The mold release agent is preferably at least one compound selected from aliphatic carboxylic acids, aliphatic carboxylic acid esters, aliphatic hydrocarbon compounds having a number average molecular weight of 200 to 15,000, and polyolefin compounds. Among others, at least one compound selected from polyolefin compounds, aliphatic carboxylic acids, and aliphatic carboxylic acid esters is more preferably used.

Aliphatic carboxylic acids include saturated or unsaturated aliphatic monocarboxylic acids, dicarboxylic acids or tricarboxylic acids. As used herein, the term "aliphatic carboxylic acid" is used to also include an alicyclic carboxylic acid. Among aliphatic carboxylic acids, preferred are mono- or di-carboxylic acids containing 6 to 36 carbon atoms, more preferably saturated aliphatic monocarboxylic acids containing 6 to 36 carbon atoms. Specific example of such aliphatic carboxylic acids include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid, azelaic acid and the like.

Aliphatic carboxylic acid components that can be used to form aliphatic carboxylic acid esters include the aliphatic carboxylic acids listed above. On the other hand, alcohol components used to form aliphatic carboxylic acid esters include saturated or unsaturated monoalcohols, saturated or unsaturated polyalcohol and the like. These alcohols may be substituted by a substituent such as a fluorine atom, an aryl group or the like. Among these alcohols, preferred are saturated mono- or polyalcohols containing 30 or less carbon atoms, more preferably saturated aliphatic monoalcohols or polyalcohols containing 30 or less carbon atoms. As used herein, the term "aliphatic alcohol" is used to also include an alicyclic alcohol. Specific examples of these alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol and the like. These aliphatic carboxylic acid esters may contain aliphatic carboxylic acids and/or alcohols as impurities, and may be mixtures of multiple compounds. Specific examples of aliphatic carboxylic acid esters include beeswax (a mixture containing myricyl palmitate as a major component), stearyl stearate, behenyl behenate, octyldodecyl behenate, glyceryl monopalmitate, glyceryl monostearate, glyceryl distearate, glyceryl tristearate, pentaerythritol monopalmitate, pentaerythritol monostearate, pentaerythritol distearate, pentaerythritol tristearate, and pentaerythritol tetrastearate. Polyolefin compounds include compounds selected from paraffin waxes and polyethylene waxes, among which preferred are paraffin waxes having a weight average molecular weight of 700 to 10,000, more particularly 900 to 8,000 because they are polyolefin compounds showing good dispersion.

The amount of the mold release agent optionally contained in the resin compositions of the present invention should be 0.01 to 5 parts by weight, more preferably 0.05 to 3 parts by weight per 100 parts by weight of resin components. The resin compositions of the present invention may contain only one or more than one mold release agent. If two or more mold release agents are contained, the total amount should be in the ranges defined above.

The resin compositions of the present invention may contain other components without departing from the spirit of the present invention. The other components include stabilizers other than phosphorus-based stabilizers, UV absorbers, flame retardants, inorganic fillers other than those described above, white pigments other than titanium oxides, fluorescent brighteners, anti-dripping agents, antistatic agents, anti-fogging agents, lubricants, anti-blocking agents, flow improvers, plasticizers, dispersants, antibacterial agents and the like. These may be used as a combination of two or more of them.

Information about these components can be found in the description of JPA2007-314766, JPA2008-127485, JPA2009-51989, JPA2012-72338 and the like, the disclosures of which are incorporated herein by reference.

Processes for preparing the resin compositions of the present invention are not specifically limited, and known processes for preparing thermoplastic resin compositions can be widely employed. Specifically, the resin compositions can be prepared by mixing various components in advance using various mixers such as a tumbler or a Henschel mixer, and then melting/kneading the mixture in a Banbury mixer, roller unit, Brabender extruder, single screw kneading extruder, double screw kneading extruder, kneader or the like.

Alternatively, the resin compositions of the present invention can also be prepared by feeding various components that have not been mixed in advance or have been partially mixed in advance through feeders to an extruder where they are melted/kneaded, for example. As another alternative, the resin compositions of the present invention can also be prepared by mixing some components in advance and feeding the mixture to an extruder where it is melted/kneaded to give a resin composition, which is used as a master batch to mix this master batch with the remaining components and melt/knead the mixture, for example.

Processes for preparing resin molded articles from the resin compositions of the present invention are not specifically limited, and any molding techniques commonly adopted for thermoplastic resins can be employed, i.e., normal injection molding, ultra-high speed injection molding, injection compression molding, two-color molding, hollow molding such as gas-assisted molding, molding techniques using thermally insulated molds, molding techniques using rapidly heated molds, expansion molding (including the use of supercritical fluids), insert molding, IMC (In-Mold Coating) molding techniques, extrusion molding, sheet molding, heat molding, rotational molding, laminate molding, press molding and the like. Further, molding techniques using hot runner systems can also be selected.

The resin molded articles of the present invention can have an $L^*$ value of, for example, 80 to 100, more particularly 85 to 100. The resin molded articles having such an $L^*$ value can be conveniently used as those in various colors. Especially, the resin molded articles of the present invention can be in white substantially without adding any dyes or pigments.

Next, a process for plating a surface of a resin molded article obtained by molding a thermoplastic resin composition of the present invention is explained with reference to FIG. 1. FIG. 1 is a schematic diagram showing a process for plating a surface of a resin molded article 1 by the laser direct structuring technology. In FIG. 1, the resin molded article 1 is shown as a flat substrate, but may not necessarily be a flat substrate and instead a resin molded article having a partially or totally curved surface. Further, the resin molded article is intended to include not only an end product but also various parts. Resin molded articles according to the present invention are preferably used as parts for portable electronic devices, vehicles and medical devices and other electronic parts containing electric circuits. Especially, resin molded articles according to the present invention can achieve not only high impact resistance and rigidity but also excellent heat resistance as well as low anisotropy and low warpage so that they are very effective as internal structures and chassis for electronic organizers, PDAs such as handheld computers, pagers, cell phones, PHS phones and the like. In particular, the resin molded articles are suitable for use as flat parts having an average thickness of 1.2 mm or less excluding ribs (and 0.4 mm or more, for example, though the lower limit is not specifically defined), and they are especially suitable for use as chassis for portable electronic devices.

Referring back to FIG. 1, the resin molded article 1 is irradiated with a laser beam 2. The source of the laser beam is not specifically limited, and can be appropriately selected from known lasers such as YAG lasers, excimer lasers, electromagnetic radiation and the like, especially preferably YAG lasers. Further, the wavelength of the laser beam is not specifically limited, either. A preferred wavelength range is 200 nm to 1200 nm, especially preferably 800 to 1200 nm.

Once the resin molded article 1 is irradiated with the laser beam, it is activated only in the region 3 irradiated with the laser beam. A plating solution 4 is applied to the activated resin molded article 1. The plating solution 4 is not specifically limited, and known plating solutions can be widely employed, preferably those containing a metal component such as copper, nickel, gold, silver or palladium, more preferably copper.

The method by which the plating solution 4 is applied to the resin molded article 1 is not specifically limited either, but involves, for example, placing the article into a liquid containing the plating solution. After the plating solution has been applied, a plated layer 5 is formed only in the region of the resin molded article irradiated with the laser beam.

According to the processes of the present invention, circuits can be formed at distances of 1 mm or less, or even 150 μm or less from each other (and 30 μm or more, for example, though the lower limit is not specifically defined). Such circuits are preferably used as antennas for portable electronic devices. Thus, an example of a preferred embodiment of a resin molded article according to the present invention is a resin molded article having a plated layer on its surface for use as a part for portable electronic devices wherein the plated layer has performance as an antenna.

EXAMPLES

The following examples further illustrate the present invention. The materials, amounts used, proportions, process details, procedures and the like shown in the following examples can be changed as appropriate without departing from the spirit of the present invention. Thus, the scope of the present invention is not limited to the specific examples shown below.

The resistivity of each conductive oxide was measured as follows: The resistivity was measured with the tester "model 3223" from Yokogawa Electric Corporation by loading 10 g of fine powder of the conductive oxide into a cylinder having an internal diameter of 25 mm coated with Teflon® on the inside and pressurizing it at 100 kg/cm$^2$ (packing density 20%).

Preparation Example 1

(Synthesis of a Polyamide (PAPXD10))

A reaction vessel having an internal volume of 50 L equipped with a stirrer, a partial condenser, a total condenser, a thermometer, a dropping device and a nitrogen inlet as well as a strand die was charged with precisely weighed 8950 g (44.25 mol) of sebacic acid (available under the product name sebacic acid TA from Itoh Oil Chemicals Co., Ltd.), 12.54 g (0.074 mol) of calcium hypophosphite, and 6.45 g (0.079 mol) of sodium acetate. The inside of the reaction vessel was thoroughly purged with nitrogen and then pressurized with nitrogen to 0.4 MPa and heated from 20° C. to 190° C. with stirring to homogeneously melt sebacic acid for 55 minutes. Then, 5960 g (43.76 mol) of p-xylylenediamine (from MITSUBISHI GAS CHEMICAL COMPANY, INC.) was added dropwise with stirring over 110 minutes. During then, the temperature in the reaction vessel was continuously raised to 293° C. During the dropwise addition step, the pressure was controlled at 0.42 MPa and the water generated was removed outside the system through the partial condenser and the total condenser. The temperature in the partial condenser was controlled in the range of 145 to 147° C. After completion of the dropwise addition of p-xylylenediamine, the polycondensation reaction was continued for 20 minutes while the pressure in the reaction vessel was kept at 0.42 MPa. During then, the temperature in the reaction vessel was raised to 296° C. Then, the pressure in the reaction vessel was lowered from 0.42 MPa to 0.12 MPa for 30 minutes. During then, the internal temperature rose to 298° C. Then, the pressure was lowered at a rate of 0.002 MPa/min to 0.08 MPa for 20 minutes to control the amount of components having a molecular weight of 1,000 or less. At the end of depressurization, the temperature in the reaction vessel was 301° C. Then, the inside of the system was pressurized with nitrogen, and the resulting polymer was collected in the form of strands from the strand die at an internal temperature in the reaction vessel of 301° C. and a resin temperature of 301° C., cooled in cooling water at 20° C. and pelletized to give about 13 kg of a polyamide resin. The cooling time in cooling water was 5 seconds, and the strand take-up rate was 100 m/min. This polyamide resin is hereinafter designated as "PAPXD10". It had a melting point of 290° C.

Preparation Example 2

(Synthesis of a Polyamide (PAMP6))

In a reaction vessel under a nitrogen atmosphere, adipic acid (from Rhodia) was melted by heating and then the temperature was raised to 270° C. while a diamine mixture of p-xylylenediamine (from MITSUBISHI GAS CHEMICAL COMPANY, INC.) and m-xylylenediamine (from MITSUBISHI GAS CHEMICAL COMPANY, INC.) in a molar ratio of 3:7 was gradually added dropwise under pressure (0.35 Mpa) while stirring the contents until the molar ratio of diamine to adipic acid reached about 1:1. After completion of the dropwise addition, the pressure was lowered to 0.06 MPa and the reaction was continued for 10 minutes to control the amount of components having a molecular weight of 1,000 or less. Then, the contents were collected in the form of strands and pelletized in a pelletizer to give a polyamide. This is hereinafter designated as "PAMP6". It had a melting point of 256° C.

<Resin Components>

S-3000F: A polycarbonate resin from Mitsubishi Engineering-Plastics Corporation.

AT-08: An ABS resin from NIPPON A&L INC.

5008: A polybutylene terephthalate resin having an intrinsic viscosity of 0.85 dl/g and a terminal carboxyl group concentration of 12 eq/ton from Mitsubishi Engineering-Plastics Corporation.

PBK-1: A polyethylene terephthalate resin having an intrinsic viscosity of 0.70 from Mitsubish Chemical Corporation.

<Glass Fillers>

T-571: A chopped strand product having a diameter (average fiber diameter) of 13 μm and using a urethane resin as a sizing agent from Nippon Electric Glass Co., Ltd.

T-595: A chopped strand product having a diameter (average fiber diameter) of 13 μm and using a silicone resin as a sizing agent from Nippon Electric Glass Co., Ltd.

99S: A milled fiber product having a diameter (average fiber diameter) of 10 μm from Asahi Fiber Glass Co., Ltd.

03T-296GH: A product from Nippon Electric Glass Co., Ltd.

810S: A product from NITTO BOSEKI CO., LTD.

T-187: A chopped strand product having a diameter (average fiber diameter) of 13 μm and treated with a Bis-A epoxy resin from Nippon Electric Glass Co., Ltd.

<Talc (Silicate Minerals)>

5000PJ: A product from MATSUMURA SANGYO KABUSHIKI KAISHA.

Micron White 5000S (MW5000S): A product from Hayashi-Kasei Co., Ltd.

<LDS Additives>

23K: An aluminum-doped zinc oxide having a resistivity (nominal) of 100 to 500 Ω·cm from HakusuiTech Co., Ltd.

W-4: An undoped tin oxide having a resistivity of $5.00 \times 10^2$ Ω·cm from Mitsubishi Materials Corporation.

Pazet CK: An aluminum-doped zinc oxide having a resistivity of $8.00 \times 10^3$ Ω·cm from HakusuiTech Co., Ltd.

<Non-Conductive Metal Oxides>

CPK: A titanium dioxide from RESINO COLOR INDUSTRY CO., LTD.

CR-63: A titanium dioxide from ISHIHARA SANGYO KAISHA, LTD.

CR-60: A titanium dioxide from ISHIHARA SANGYO KAISHA, LTD.

<Elastomer>

M-711: A core-shell elastomer consisting of a butadiene core and an acrylic shell from Kaneka Corporation.

<Phosphorus-Based Stabilizers>

PEP36: Bis(2,6-di-tert-butyl-4-methylphenyl)pentaerythritol diphosphite from ADEKA.

AX71: A mixture of mono- and di-stearyl acid phosphates from ADEKA.

ADK 2112: Tris(2,4-di-tert-butylphenyl) phosphite from ADEKA.

<Antioxidants>

Irg1076: Irganox 1076, octadecyl 3-(3,5-di-tert-butyl-4-hydroxyphenyl)propionate from BASF.

Irganox 1098: N,N'-hexamethylenebis[3-(3,5-di-t-butyl-4-hydroxyphenyl)propionamide] from BASF.

AO-60: Pentaerythritol tetrakis[3-(3,5-di-tert-butyl-4-hydroxyphenyl)propionate] from ADEKA.

<Mold Release Agents>

VPG861: Pentaerythritol tetrastearate from Cognis Oleochemicals Japan Ltd.

CS-8CP: A product from NITTO KASEI KOGYO K.K.

PED522: A polyethylene oxide having an acid number of 22 to 28 mg KOH and a dropping point of 102 to 107° C. from Clariant.

Compounds (Examples 1 to 4, and 7 to 12, and Comparative Examples 1 to 3)

Various components were weighed out in the compositions shown in the tables below, and mixed in a tumbler for 20 minutes, and then the mixture was fed to an extruder with one vent (TEX30HSST) from The Japan Steel Works, LTD., where the mixture was kneaded under the conditions of a screw rotation speed of 200 rpm, an output rate of 20 kg/hr, and a barrel temperature of 300° C., and the resulting molten resin extruded in the form of strands was rapidly cooled in a water bath, and pelletized using a pelletizer to give pellets of resin compositions.

Compounds (Examples 5, and 13 to 17, and Comparative Examples 4 to 12)

Various components were weighed out in the compositions shown in the tables below, and mixed in a tumbler for 20 minutes, and then the mixture was fed to an extruder with one vent (TEX30HSST) from The Japan Steel Works, LTD., where the mixture was kneaded under the conditions of a screw rotation speed of 200 rpm, an output rate of 20 kg/hr, and a barrel temperature of 280° C., and the resulting molten resin extruded in the form of strands was rapidly cooled in a water bath, and pelletized using a pelletizer to give pellets of resin compositions.

Compounds (Examples 18 to 21)

Various components were weighed out in the compositions shown in the tables below, and all components excluding the glass fibers were blended in a tumbler and the blend was introduced into a twin-screw extruder (TEM-26SS from TOSHIBA MACHINE CO., LTD.) from the rear ends of the screws and melted, and then the glass fibers were fed from a side feeder to prepare resin pellets. The temperature setting of the extruder was 280° C.

Compounds (Examples 22 to 25)

Various components were weighed out in the compositions shown in the table below, and all components excluding the glass fiber were blended in a tumbler and mixed in the tumbler for 20 minutes, and then the mixture was introduced into a twin-screw extruder (TEX30α from The Japan Steel Works, LTD.) from the rear ends of the screws and melted, and then the glass fiber was fed from a side feeder and the mixture was kneaded under the conditions of a screw rotation speed of 200 rpm, an output rate of 40 kg/hr, and a barrel temperature of 260° C., and the resulting molten resin extruded in the form of strands was rapidly cooled in a water bath, and pelletized using a pelletizer to give pellets of resin compositions.

<Platability>

The pellets of Examples 1 to 4, and 7 to 12, and Comparative examples 1 to 3 obtained by the preparation procedure described above were dried at 120° C. for 5 hours, and then injection-molded using SG75-MII from Sumitomo Heavy Industries, Ltd. under the conditions of a cylinder temperature of 300° C. and a mold temperature of 100° C. for a molding cycle time of 50 seconds to form plates having a thickness of 2 mm.

The pellets of Examples 5, 6, and 13 to 17, and Comparative examples 4 to 12 obtained by the preparation procedure described above were dried at 100° C. for 5 hours, and then injection-molded using SG75-MII from Sumitomo Heavy Industries, Ltd. under the conditions of a cylinder temperature of 280° C. and a mold temperature of 80° C. for a molding cycle time of 50 seconds to form plates having a thickness of 2 mm.

The pellets of Examples 18 to 21 obtained by the preparation procedure described above were dried at 80° C. for 5 hours, and then injection-molded using an injection molding machine (100T) from FANUC Corporation under the conditions of a cylinder temperature of 280° C. and a mold temperature of 130° C. to form plates having a thickness of 2 mm.

The pellets of Examples 22 to 25 obtained by the preparation procedure described above were dried at 120° C. for 5 hours, and then injection-molded using NEX80-9E from NISSEI PLASTIC INDUSTRIAL CO., LTD. under the conditions of a cylinder temperature of 260° C. and a mold temperature of 80° C. for a molding cycle time of 44 seconds to form plates having a thickness of 3 mm.

A surface of each plate having a thickness of 2 mm or 3 mm was irradiated with a YAG laser beam having a wavelength of 1064 nm under the conditions of a scanning speed of 2 m/s, an output power of 13 W, 10 W, 8 W, 5 W, or 3 W, and a pulse period of 10 µS, 20 µS, 30 µS, 40 µS, or 50 µS in a total of 25 cells. Subsequently, it was subjected to electroless copper plating using MID 100XB from MacDermid. Then, the plate was observed and evaluated by a five-level rating scale from A to E according to how many cells were found to have been plated among the 25 cells of the laser-irradiated region.

A: 15 cells or more;

B: 10 to 14 cells;

C: 5 to 9 cells;

D: 1 to 4 cells;

E: 0 cells.

<Flexural Strength and Flexural Modulus>

The pellets of Examples 15 to 17 and Comparative example 12 obtained by the preparation procedure described above were dried at 100° C. for 5 hours, and then injection-molded using SG75-MII from Sumitomo Heavy Industries, Ltd. under the conditions of a cylinder temperature of 280° C. and a mold temperature of 90° C. for a molding cycle time of 50 seconds to form ISO tensile test specimens having a thickness of 4 mm.

The ISO tensile test specimens (having a thickness of 4 mm) described above were used to determine their flexural modulus (expressed in MPa) and flexural strength (expressed in MPa) at a temperature of 23° C. according to ISO178.

<Charpy Impact Strength>

The ISO tensile test specimens (having a thickness of 4 mm) obtained as described above were used to determine their Charpy unnotched impact strength and Charpy notched impact strength (expressed in $kJ/m^2$) under the conditions of 23° C. according to ISO179.

<MVR>

The pellets of Examples 15 to 17 and Comparative example 12 obtained by the preparation procedure described above were dried at 100° C. for 4 to 8 hours, and then measured for their melt volume rate (MVR) using MELT INDEXER F-F01 from Toyo Seiki Seisaku-Sho, Ltd. under the load of 5 kgf at a temperature of 270° C. Higher values of MVR indicate more advanced degradation.

<L Value>

The pellets of Examples 15 to 17 and Comparative example 12 obtained by the preparation procedure described above were dried at 100° C. for 5 hours, and then injection-molded using SG75-MII from Sumitomo Heavy Industries, Ltd. under the conditions of a cylinder temperature of 280° C. and a mold temperature of 80° C. for a molding cycle time of 30 seconds to form plates having a thickness of 2 mm.

The plates having a thickness of 2 mm obtained as described above were used to determine their L* value (lightness) according to JIS K-7105 using the spectrocolorimeter model SE6000 from NIPPON DENSHOKU INDUSTRIES CO., LTD. in the reflection mode with Illuminant C/2°.

Higher L* values indicate that the molded article has higher whiteness.

The results are shown in the tables below. In the tables, the amounts are expressed in parts by weight.

TABLE 1

| Component | Designation | Ex. 1 | Ex. 2 | Ex. 3 | Comp. Ex. 1 | Ex. 4 | Comp. Ex. 2 | Comp. Ex. 3 |
|---|---|---|---|---|---|---|---|---|
| Thermoplastic resin | S-3000F | 100.0 | 100.0 | 100.0 | 100.0 | 100.0 | 100.0 | 100.0 |
|  | AT-08 |  |  |  |  |  |  |  |
| LDS additive (powder resistivity ($\Omega \cdot cm$)) | 23K | 4.3 | 9.0 | 19.9 |  | 9.5 |  |  |
|  | W-4 |  |  |  | 19.9 |  |  |  |
|  | Pazet CK |  |  |  |  |  | 9.0 | 19.9 |
| Non-conductive metal oxide | CPK |  |  |  |  | 6.0 |  |  |
| Platability |  | D | C | B | E | A | E | E |

TABLE 2

| Component | Designation | Ex. 5 | Ex. 6 | Ex. 7 | Ex. 8 | Ex. 9 | Ex. 10 | Ex. 11 | Ex. 12 |
|---|---|---|---|---|---|---|---|---|---|
| Thermoplastic resin | S-3000F | 82.8 | 64.5 | 100.0 | 100.0 | 100.0 | 100.0 | 100.0 | 100.0 |
|  | AT-08 | 17.2 | 35.5 |  |  |  |  |  |  |
| Glass filler | T571 |  |  | 20.4 | 51.3 |  |  |  |  |
|  | 99S |  |  |  |  | 20.4 | 51.3 |  |  |
| Silicate mineral | #5000PJ |  |  |  |  |  |  | 6.0 | 12.7 |
| LDS additive | 23K | 9.5 | 9.5 | 10.9 | 11.7 | 10.4 | 11.7 | 9.6 | 10.2 |
|  | W-4 |  |  |  |  |  |  |  |  |
|  | Pazet CK |  |  |  |  |  |  |  |  |
| Platability |  | C | C | C | C | C | C | D | D |

TABLE 3

| Component | Designation | Ex. 13 | Ex. 14 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Thermoplastic resin | S-3000F | 58.9 | 58.9 | 83.1 | 79.6 | 79.6 | 82.0 | 82.2 | 78.4 | 78.4 | 74.8 |
|  | AT-08 | 41.1 | 41.1 | 16.9 | 20.4 | 20.4 | 18.0 | 17.8 | 21.6 | 21.6 | 18.9 |
| Glass filler | T571 | 20.5 |  |  | 20.4 |  |  |  | 21.6 |  |  |
|  | 99S |  | 20.5 |  |  | 20.4 |  |  |  | 21.6 |  |
| Silicate mineral | #5000PJ |  |  |  |  |  | 6.0 |  |  |  | 6.3 |
| LDS additive | 23K | 11.0 | 11.0 |  |  |  |  |  |  |  |  |
|  | W-4 |  |  |  |  |  |  |  |  |  |  |
|  | Pazet CK |  |  | 9.0 | 10.9 | 10.9 | 9.6 | 9.5 | 11.5 | 11.5 | 10.1 |
| Non-conductive metal oxide | CPK | 5.5 | 5.5 |  |  |  |  |  |  |  |  |
| Platability |  | A | A | E | E | E | E | E | E | E | E |

TABLE 4

| Component | Designation | Ex. 15 | Ex. 16 | Ex. 17 | Comp. Ex. 12 |
|---|---|---|---|---|---|
| Thermoplastic resin | S-3000F | 56.9 | 56.9 | 56.9 | 56.9 |
|  | AT-08 | 43.2 | 43.2 | 43.2 | 43.2 |
| Glass filler | T595 | 21.6 | 21.6 | 21.6 | 21.6 |
|  | 99S |  |  |  |  |
| LDS additive | 23K | 11.5 | 11.5 | 11.5 |  |
|  | W-4 |  |  |  |  |
|  | Pazet CK |  |  |  | 11.5 |
| Non-conductive metal oxide | CPK | 5.8 | 5.8 | 5.8 | 5.8 |
| Elastomer | M711 | 4.3 | 4.3 | 4.3 | 4.3 |
| Phosphorus-based stabilizer | AX71 | 0.1 |  |  | 0.1 |
|  | PEP36 |  | 0.1 |  |  |
|  | ADK 2112 |  |  | 0.1 |  |
| Antioxidant | Irg1076 | 0.1 | 0.1 | 0.1 | 0.1 |
| Mold release agent | VPG861 | 0.4 | 0.4 | 0.4 | 0.4 |
| Properties | expressed in |  |  |  |  |
| Platability | — | A | A | A | E |
| Flexural modulus | MPa | 4,400 | 4,400 | 4,400 | 4,600 |
| Flexural strength | MPa | 85 | 87 | 85 | 87 |
| Charpy notched strength | kJ/m$^2$ | 22 | 21 | 18 | 14 |
| Charpy unnotched strength | kJ/m$^2$ | 73 | 70 | 71 | 59 |
| MVR | cm$^3$/10 min | 19 | 19 | 21 | 23 |
| Lightness | L* | 90 | 90 | 90 | 89 |

TABLE 5

| Component | Designation | Ex. 18 | Ex. 19 |
|---|---|---|---|
| Resin composition | PAMP6 | 100.0 | 100.0 |
| LDS additive | 23K | 11.4 | 20.5 |
| Glass fiber | 03T-296GH | 75.9 | 82.1 |
| Mold release agent | CS-8CP | 0.6 | 0.6 |
| Silicate mineral | MW5000S | 1.9 | 2.1 |
| Platability |  | C | B |

TABLE 6

| Component | Designation | Ex. 20 | Ex. 21 |
|---|---|---|---|
| Thermoplastic resin | PAPXD10 | 100.0 | 100.0 |
| LDS additive | 23K | 14.4 | 11.6 |
| Non-conductive metal oxide | CR-63 | 36.0 | 58.0 |
| Glass filler | 810S | 83.9 | |
| | 03T-296GH | | 19.3 |
| Antioxidant | Irganox 1098 | 2.4 | 1.9 |
| Mold release agent | CS-8CP | 0.7 | 0.6 |
| Silicate mineral | MW5000S | 2.4 | 1.9 |
| Platability | | B | A |

TABLE 7

| Component | Designation | Ex. 22 | Ex. 23 | Ex. 24 | Ex. 25 |
|---|---|---|---|---|---|
| Thermoplastic resin | 5008 | 100.0 | 70.0 | 70.0 | 70.0 |
| | PBK-1 | 0.0 | 30.0 | 30.0 | 30.0 |
| LDS additive | 23K | 6.0 | 6.0 | 5.5 | 5.0 |
| Non-conductive metal oxide | CR-60 | | | 9.2 | 20.2 |
| Glass fiber | T-187 | 50.3 | 50.4 | 55.0 | 60.6 |
| Antioxidant | AO-60 | 0.3 | 0.3 | 0.4 | 0.4 |
| Phosphorus-based stabilizer | AX-71 | | 0.2 | 0.2 | 0.2 |
| Mold release agent | PED522 | 0.3 | 0.3 | 0.4 | 0.4 |
| Platability | | D | D | B | A |

It was shown from the tables above that the compositions of the present invention are excellent in platability (Examples 1 to 17). However, it was shown that platability was poor when an LDS additive even containing a conductive oxide having a resistivity of $5 \times 10^3$ Ω·cm or less but not containing two or more metals was used (Comparative examples 1) or when LDS additives even containing two or more metals but having a resistivity higher than $5 \times 10^3$ Ω·cm were used (Comparative examples 2 to 12). It was also shown that platability is more improved in the compositions of the present invention when they further contain a non-conductive metal oxide (Examples 4, and 13 to 17).

Further, it was shown from Examples 18 to 21 that platability is also excellent when polyamide resins are used as resin components of the compositions of the present invention.

Furthermore, it was shown from Examples 22 to 25 that platability is also excellent when thermoplastic polyester resins are used as resin components of the compositions of the present invention.

The invention claimed is:

1. A resin composition comprising a thermoplastic resin, and a laser direct structuring additive containing at least two kinds of metals and also containing a conductive oxide having a resistivity of $5 \times 10^3$ Ω·cm or less.

2. The resin composition according to claim 1, wherein the laser direct structuring additive contains at least a metal of Group n, wherein n is an integer of 3 to 16, and a metal of Group n+1 of the periodic table.

3. The resin composition according to claim 2, wherein an amount of one of the metal of Group n, wherein n is an integer of 3 to 16, and the metal of Group n+1 of the periodic table contained in the laser direct structuring additive is 15 mol % or less provided that the total amount of the metals is 100 mol %.

4. The resin composition according to claim 2, wherein n is 12.

5. The resin composition according to claim 2, wherein the metal of Group n, wherein n is an integer of 3 to 16, of the periodic table is zinc.

6. The resin composition according to claim 2, wherein the metal of Group n+1 of the periodic table is aluminum.

7. The resin composition according to claim 1, wherein the thermoplastic resin comprises resin components including 40 to 100% by weight of a polycarbonate resin and 0 to 60% by weight of a styrene-based resin, a polyamide resin, or a thermoplastic polyester resin.

8. The resin composition according to claim 1, further comprising a glass filler.

9. The resin composition according to claim 1, further comprising a silicate mineral.

10. The resin composition according to claim 9, wherein the silicate mineral is talc.

11. The resin composition according to claim 1, further comprising a non-conductive metal oxide.

12. The resin composition according to claim 11, wherein the non-conductive metal oxide is a titanium oxide.

13. A resin molded article obtained by molding the resin composition according to claim 1.

14. The resin molded article according to claim 13, having a plated layer on a surface of the resin molded article.

15. The resin molded article according to claim 14, wherein the plated layer has performance as an antenna.

16. The resin molded article according to claim 13, which is a part for portable electronic devices.

17. A process for preparing a resin molded article having a plated layer, comprising irradiating a surface of a resin molded article obtained by molding the resin composition according to claim 1 with a laser beam, and then applying a metal to form the plated layer.

18. The process for preparing a resin molded article having a plated layer according to claim 17, wherein the plated layer is a copper plated layer.

19. A process for manufacturing a part having an antenna for portable electronic devices, comprising the process for preparing a resin molded article having a plated layer according to claim 17.

20. A laser direct structuring additive comprising a conductive oxide having a resistivity of $5 \times 10^3$ Ω·cm or less, which contains at least a metal of Group n, wherein n is an integer of 3 to 16, and a metal of Group n+1 of the periodic table, wherein an amount of one of the metal of Group n, wherein n is an integer of 3 to 16, and the metal of Group n+1 of the periodic table contained in the laser direct structuring additive is 15 mol % or less provided that the total amount of the metals is 100 mol %.

* * * * *